Patented Dec. 26, 1950

2,535,572

UNITED STATES PATENT OFFICE 2,535,572

PREPARATION OF UF$_6$

Raymond M. Hainer, Revere, Mass., assignor to the United States of America as represented by the United States Atomic Energy Commission No Drawing. Application April 9, 1948,
Serial No. 20,094

3 Claims. (Cl. 23—14.5)

This invention relates to a method of preparing uranium hexafluoride and more particularly to a method of converting uranium tetrafluoride to uranium hexafluoride.

It is an object of this invention to provide a method of preparing uranium hexafluoride. The preparation of uranium hexafluoride has involved considerable difficulty. An object of the present invention is to provide a simple method for the preparation of uranium hexafluoride which does not involve some of the difficulties formerly encountered.

Heretofore uranium hexafluoride has been prepared by fluorinating uranium pentachloride with fluorine or dry hydrogen fluoride and by fluorinating uranium carbide with fluorine in the presence of chlorine at a temperature of —70° C. These former processes of preparing uranium hexafluoride have required the handling of such extremely corrosive and dangerous fluorinating agents as fluorine and hydrogen fluoride. Accordingly, it is an object of this invention to provide a method of preparing uranium hexafluoride that does not require the handling of such corrosive and dangerous fluorinating agents as fluorine and hydrogen fluoride.

A further object of this invention is to provide a method of converting uranium tetrafluoride to uranium hexafluoride.

Still further objects of the present invention will be apparent from the following description taken in connection with the appended claims.

Broadly, the objects of this invention are accomplished by treating uranium tetrafluoride with an oxidizing agent such as oxygen under optimum conditions of temperatures, pressure, and physical form. Although this oxidation may be accomplished over quite a range of temperature, the optimum temperature for accomplishing the above stated objects was ascertained to be between 400° C. and 1000° C. and more particularly between 600° C. and 900° C.

In accordance with the present invention uranium hexafluoride is prepared by reacting uranium tetrafluoride under anhydrous conditions with dry oxygen in a suitable apparatus which may be electrically heated to the optimum elevated temperature necessary to carry out the reaction. Ordinary commercial uranium tetrafluoride usually in the form of a green powder is placed in the electrically heated dry tube and after the system is dried is treated with anhydrous oxygen, which has been dried by contacting with a drying agent such as P$_2$O$_5$, at an elevated temperature between 600° C. and 900° C. The volatile uranium hexafluoride forming shortly after the reaction starts is carried out of the reaction tube by the gas stream and condensed in a suitable condenser. This reaction of uranium tetrafluoride with dry oxygen probably proceeds according to the following equation:

$$2UF_4 + O_2 \rightarrow UF_6 + UO_2F_2$$

One example of the process carried out in accordance with the present invention is as follows. Ten grams of uranium tetrafluoride contained in a slip-cast CaF$_2$ boat which had been fired at 1300° C. and placed in a "Vycor" tube was heated electrically to 650° C. to 680° C., and a stream of anhydrous oxygen dried over P$_2$O$_5$ was slowly passed over the uranium tetrafluoride for two hours. The uranium hexafluoride was removed with the exit gases and adsorbed in the exit line adsorbent and a white sublimate, probably UO$_2$F$_2$, was collected in the cooler portions of the tube. At the end of two hours the sample of uranium tetrafluoride was found to have lost 11% of its weight. The same sample of uranium tetrafluoride heated subsequently for two more hours in a stream of O$_2$ at a higher elevated temperature between 800° C. and 860° C. was found to have lost 38% of its weight. The rate of reaction increased as the temperature was raised. It was further ascertained that the optimum temperature for this preparation of uranium hexafluoride was between 700° C. and 900° C.

In a second example of the process to be followed in the preparation of uranium hexafluoride in accordance with the present invention, fourteen grams of uranium tetrafluoride contained in a slip-cast CaF$_2$ boat which had be fired at 1300° C. was placed in a modified type of borosilicate glass tube, a so-called "Vycor" tube. The system was evacuated by pumping and slowly heated to 300° C. At end of twenty minutes the temperature was raised to 400° C. and oxygen dried over P$_2$O$_5$ was fed in at the rate of about 2 cc. per second and the temperature was raised from 400° C. to 700° C. in about 10 minutes. The sample of uranium tetrafluoride was then heated for two hours at 700° C. in a stream of dry oxygen and upon cooling was found to have lost 3.6 grams or 25% by weight. The uranium hexafluoride forming shortly after the reaction started was removed with the exit gases and adsorbed in the exit line adsorbent; while uranyl fluoride was collected as a white sublimate in the cooler portions of the tube near the exit.

This simple method of preparing uranium hexafluoride by the conversion of uranium tetrafluoride to uranium hexafluoride by oxidation with dry oxygen under anhydrous conditions at elevated temperatures as disclosed by the present invention does not require the handling of the such extremely corrosive and dangerous fluorinating agents as fluorine and hydrogen fluoride, which considerably increased the difficulties of the former preparations of uranium hexafluoride, and may well be used in laboratories requiring small amounts of uranium hexafluoride which do not desire to handle the corrosive and dangerous fluorinating agents, fluorine and hydrogen fluoride.

Having broadly and specifically disclosed the present invention, it is apparent that many modifications and variations may be made without departing essentially from the nature and scope thereof as may be included within the following claims and it is intended to cover in the appended claims all such modifications as fall within the true spirit and scope of the disclosed invention.

I claim:

1. A process of preparing uranium hexafluoride which comprises treating uranium tetrafluoride with anhydrous oxygen at an elevated temperature.

2. A process of preparing uranium hexafluoride which comprises treating uranium tetrafluoride with anhydrous oxygen under anhydrous conditions at a temperature between 600° C. and 900° C.

3. A method of converting uranium tetrafluoride to uranium hexafluoride which comprises heating uranium tetrafluoride in an evacuated apparatus to a temperature between 200° C. and 300° C. and then flowing anhydrous oxygen over the heated uranium tetrafluoride and raising the temperature to between 600° C. and 900° C.

RAYMOND M. HAINER.

REFERENCES CITED

The following references are of record in the file of this patent:

Gmelin-Kraut, Handbuch der anorganisch Chemie, volume 3.1, page 1108 (1912). (Copy in Division 59.)